UNITED STATES PATENT OFFICE.

HENRY M. CALDWELL, OF SYDNEY, NEW SOUTH WALES, ASSIGNOR TO HARRY JAMES GOODRICKE CATTANACH, OF SAME PLACE.

DEODORANT AND DISINFECTANT.

SPECIFICATION forming part of Letters Patent No. 406,700, dated July 9, 1889.

Application filed May 27, 1886. Serial No. 203,373. (No specimens.) Patented in Victoria March 31, 1886, No. 4,488; in Queensland April 3, 1886, No. 111; in England May 24, 1886, No. 6,966, and in New South Wales June 5, 1886, No. 1,852.

*To all whom it may concern:*

Be it known that I, HENRY MALCOLM CALDWELL, manufacturing chemist, a subject of the Queen of Great Britain, residing at Sydney, in the British Colony of New South Wales, have invented a new and useful Composition of Matter to be Used as an Improved Deodorant and Disinfectant, of which the following is a specification, and for which I have secured Letters Patent in Victoria, No. 4,488, dated March 31, 1886; in Queensland, No. 111, dated April 3, 1886; in Great Britain, No. 6,966, dated May 24, 1886, and in New South Wales, No. 1,852, dated June 5, 1886, and for which I have filed an application in New Zealand.

This invention has been devised in order to produce an effective and economical deodorant and disinfectant, and one more especially useful for treating night-soil and such like noxious matters, and for flushing sewers, drains, &c. It will destroy foul smells and infectious germs of all kinds.

This improved deodorant and disinfectant consists of a peculiar combination or mixture of substances, and to manufacture it I boil, say, seven hundred weight of sulphate of iron, forty pounds of peroxide of manganese, and six pounds (6 lbs.) of oil of eucalyptus in four hundred gallons of water for, say, three hours. By boiling this mixture the desired properties of each ingredient are readily obtained and thoroughly commingled, the strength and power all being secured. This product may be used as a deodorant without disinfecting properties. I then take four tons of caustic soda and one ton of peroxide of manganese and intimately mix them. This mixture is exposed to a dull red heat for, say, forty-eight hours, then moistened with water, which latter is evaporated, and when this second preparation is dry and cold it is added to, say, one-half of the first product, and the resultant fluid is my improved deodorant and disinfectant.

In use I treat night-soil before disturbance or removal from cess-pits, &c., with the fluid of the strength produced by the before-mentioned mixtures; but for flushing sewers, drains, &c., I dilute it with water according to the "strength" of the matters to be disinfected—say, for ordinary purposes, I take equal quantities of the prepared fluid and of water.

It is to be understood that I do not claim to have discovered the deodorizing properties of any of the materials which may be used in my mixture, nor do I claim the use of any of these ingredients separate and alone, and that I do not confine myself to the exact proportions in which I use these ingredients so long as the nature of my invention be retained.

Having thus particularly described and ascertained the nature of my said invention and the manner in which the same is to be performed, I would have it understood that I only claim—

1. A composition of matter formed of sulphate of iron, oxide of manganese, oil of eucalyptus, and water, substantially in the manner and in the proportions set forth.

2. A composition of matter formed of sulphate of iron, oxide of manganese, oil of eucalyptus, water, caustic soda, and peroxide of manganese, substantially in the manner and in the proportions set forth.

Dated at Sydney, in the Colony of New South Wales, this 5th day of April, 1886.

H. M. CALDWELL.

Witnesses:
FRED WALSH,
HENRY P. CHATER.